(12) United States Patent
Choi et al.

(10) Patent No.: US 11,775,096 B2
(45) Date of Patent: Oct. 3, 2023

(54) ELECTRODE STRUCTURE COMBINED WITH ANTENNA AND DISPLAY DEVICE INCLUDING THE SAME

(71) Applicant: DONGWOO FINE-CHEM CO., LTD., Jeollabuk-do (KR)

(72) Inventors: Byung Jin Choi, Incheon (KR); Dong Pil Park, Incheon (KR); Won Hee Lee, Incheon (KR)

(73) Assignee: DONGWOO FINE-CHEM CO., LTD., Jeollabuk-do (KR)

( * ) Notice: Subject to any disclaimer, the term of this patent is extended or adjusted under 35 U.S.C. 154(b) by 6 days.

(21) Appl. No.: 17/577,784

(22) Filed: Jan. 18, 2022

(65) Prior Publication Data

US 2022/0137741 A1    May 5, 2022

Related U.S. Application Data

(63) Continuation of application No. PCT/KR2020/009380, filed on Jul. 16, 2020.

(30) Foreign Application Priority Data

Jul. 17, 2019   (KR) .......................... 10-2019-0086467

(51) Int. Cl.
*G06F 3/041*    (2006.01)
*G06F 1/16*     (2006.01)

(52) U.S. Cl.
CPC .......... *G06F 3/0412* (2013.01); *G06F 1/1698* (2013.01); *G06F 3/04164* (2019.05)

(58) Field of Classification Search
CPC ... G06F 3/0412; G06F 3/04164; G06F 1/1698
See application file for complete search history.

(56) References Cited

U.S. PATENT DOCUMENTS

2013/0271942 A1* 10/2013 Kim ..................... H05K 1/0218
                                                              361/816
2015/0185928 A1*  7/2015 Son ........................ G06F 3/0445
                                                              345/174
2016/0126614 A1*  5/2016 Lim ......................... H01Q 1/44
                                                              343/720

FOREIGN PATENT DOCUMENTS

KR    10-2003-0095557 A    12/2003
KR    10-2011-0093549 A     8/2011
KR    10-2014-0092366 A     7/2014
(Continued)

OTHER PUBLICATIONS

International Search Report for PCT/KR2020/009380 dated Oct. 28, 2020.

*Primary Examiner* — Peter D McLoone
(74) *Attorney, Agent, or Firm* — The PL Law Group, PLLC

(57) ABSTRACT

An electrode structure combined with an antenna according to an embodiment of the present disclosure includes a substrate layer, sensing electrodes, a bridge electrode and an antenna unit. The sensing electrodes are arranged on the substrate layer, and include first sensing electrodes arranged along a first direction parallel to a top surface of the substrate layer, and second sensing electrodes arranged along a second direction parallel to the top surface of the substrate layer and intersecting the first direction. The bridge electrode connects the first sensing electrodes neighboring in the first direction. The antenna unit is disposed at the same layer as that of the bridge electrode, and includes a radiator overlapping the sensing electrodes in a planar view.

15 Claims, 8 Drawing Sheets

(56) References Cited

FOREIGN PATENT DOCUMENTS

| | | | |
|---|---|---|---|
| KR | 10-2014-0100822 | A | 8/2014 |
| KR | 10-2015-0104509 | A | 9/2015 |
| KR | 10-2018-0101064 | A | 9/2018 |
| KR | 10-1940798 | B1 | 1/2019 |

* cited by examiner

ELECTRODE STRUCTURE COMBINED WITH ANTENNA AND DISPLAY DEVICE INCLUDING THE SAME

CROSS REFERENCE TO RELATED APPLICATIONS AND CLAIM OF PRIORITY

The present application is a continuation application to International Application No. PCT/KR2020/009380 with an International Filing Date of Jul. 16, 2020, which claims the benefit of Korean Patent Applications No. 10-2019-0086467 filed on Jul. 17, 2019 at the Korean Intellectual Property Office, the disclosures of which are incorporated by reference herein in their entirety.

BACKGROUND

1. Technical Field

The present invention relates to an electrode structure combined with an antenna and an image display device including the same. More particularly, the present invention relates to an electrode structure combined with an antenna including an antenna unit and a touch sensor layer, and an image display device including the same.

2. Background Art

As information technologies have been developed, a wireless communication technology such as Wi-Fi, Bluetooth, etc., is combined with an image display device in, e.g., a smartphone form. In this case, an antenna may be combined with the image display device to provide a communication function.

According to recent developments of a mobile communication technology, an antenna capable of implementing high frequency or ultra-high frequency band communications is needed in the image display device.

Further, a touch panel or a touch sensor capable of inputting a user's direction by selecting an instruction displayed on a screen with a finger or a tool is also combined with the display device, and electronic devices in which image display and information input functions can be commonly implemented are developed As both the antenna and the touch sensor exist in one display device, an additional space for mounting the antenna is required, which may be disadvantageous to developments of recent thin and light-weighted display devices. Additionally, operation reliability may be deteriorated due to mutual signal interference between the antenna and a touch sensing electrode.

SUMMARY

According to an aspect of the present invention, there is provided an electrode structure combined with an antenna having improved spatial efficiency and operational reliability.

According to an aspect of the present invention, there is provided a display device including an electrode structure combined with an antenna with improved spatial efficiency and operational reliability.

(1) An electrode structure combined with an antenna, including: a substrate layer; a plurality of sensing electrodes arranged on the substrate layer, the sensing electrodes including first sensing electrodes arranged along a first direction parallel to a top surface of the substrate layer, and second sensing electrodes arranged along a second direction parallel to the top surface of the substrate layer and intersecting the first direction; a bridge electrode connecting the first sensing electrodes neighboring in the first direction; and an antenna unit disposed at the same layer as that of the bridge electrode, the antenna unit including a radiator overlapping the sensing electrodes in a planar view.

(2) The electrode structure combined with an antenna of the above (1), further including an insulating layer covering the sensing electrodes, wherein the bridge electrode and the antenna unit are disposed on the insulating layer.

(3) The electrode structure combined with an antenna of the above (1), wherein the bridge electrode is disposed below the sensing electrodes.

(4) The electrode structure combined with an antenna of the above (3), further including an insulating layer covering the bridge electrode on the substrate layer, wherein the sensing electrodes are disposed on the insulating layer.

(5) The electrode structure combined with an antenna of the above (1), wherein corner portions of the radiator overlap four sensing electrodes around a sensing electrode overlapping a central portion of the radiator in the planar view.

(6) The electrode structure combined with an antenna of the above (1), further including a connector extending in the second direction to be integrally formed with the second sensing electrodes and connect the second sensing electrodes neighboring each other, wherein the radiator overlaps an intersection region at which the bridge electrode and the connector intersect in the planar view.

(7) The electrode structure combined with an antenna of the above (6), wherein the radiator overlaps with four sensing electrodes around the intersection region.

(8) The electrode structure combined with an antenna of the above (6), wherein the bridge electrode is included within the radiator.

(9) The electrode structure combined with an antenna of the above (8), wherein the radiator has a mesh structure defined by electrode lines crossing each other, and the mesh structure includes a separation region in which a portion of the electrode lines are cut.

(10) The electrode structure combined with an antenna of the above (9), wherein the bridge electrode extends in a space between the electrode lines and in the separation region.

(11) The electrode structure combined with an antenna of the above (1), wherein the radiator includes a mesh structure, and the sensing electrodes have a solid structure.

(12) The electrode structure combined with an antenna of the above (1), wherein the antenna unit further includes a transmission line extending from the radiator, and a signal pad connected to one end portion of the transmission line.

(13) The electrode structure combined with an antenna of the above (12), wherein the antenna unit further includes a ground pad disposed around the signal pad to be separated from the transmission line and the signal pad.

(14) The electrode structure combined with an antenna of the above (12), wherein the top surface of the substrate layer has a sensing region and a wiring region, and the sensing electrodes are arranged on the sensing region.

(15) The electrode structure combined with an antenna of the above (14), further including touch sensing pads electrically connected to the sensing electrodes and disposed on the wiring region, wherein the signal pad of the antenna unit is disposed on the wiring region.

(16) A display device including the electrode structure combined with an antenna according to embodiments as described above.

According to embodiments of the present invention, a radiator of an antenna unit may be formed at the same layer as that of a bridge electrode of a touch sensor layer, so that the antenna unit may be introduced by a process for forming the touch sensor layer. Accordingly, separate space and process for mounting the antenna unit may be omitted, and the antenna unit integrated with the touch sensor layer may be substantially implemented.

In some embodiments, a parasitic capacitance generated between a sensing electrode of the touch sensor layer and the radiator may be dispersed by adjusting a position of the radiator. Accordingly, a mutual interference caused by an overlap of the sensing electrode and the radiator may be reduced.

DETAILED DESCRIPTION OF THE EMBODIMENTS

According to exemplary embodiments of the present invention, there is provided an electrode structure combined with an antenna (hereinafter, which may be abbreviated as an electrode structure) which includes a touch sensor layer including a plurality of sensing electrodes and a bridge electrodes, and an antenna unit overlapping the touch sensor layer. Further, a display device having improved spatial efficiency and operational reliability by using the electrode structure is also provided.

Figure 1:
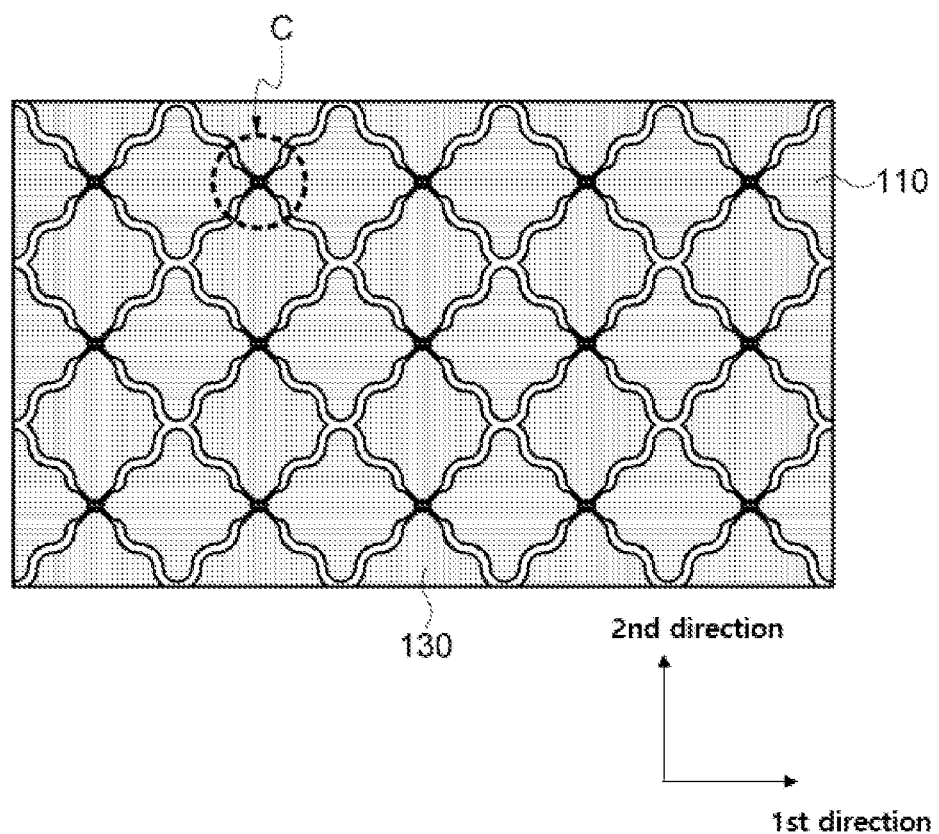
FIG. 1 is a schematic top planar view illustrating a construction of a touch sensor layer included in an electrode structure combined with an antenna in accordance with exemplary embodiments.
Figure 2:
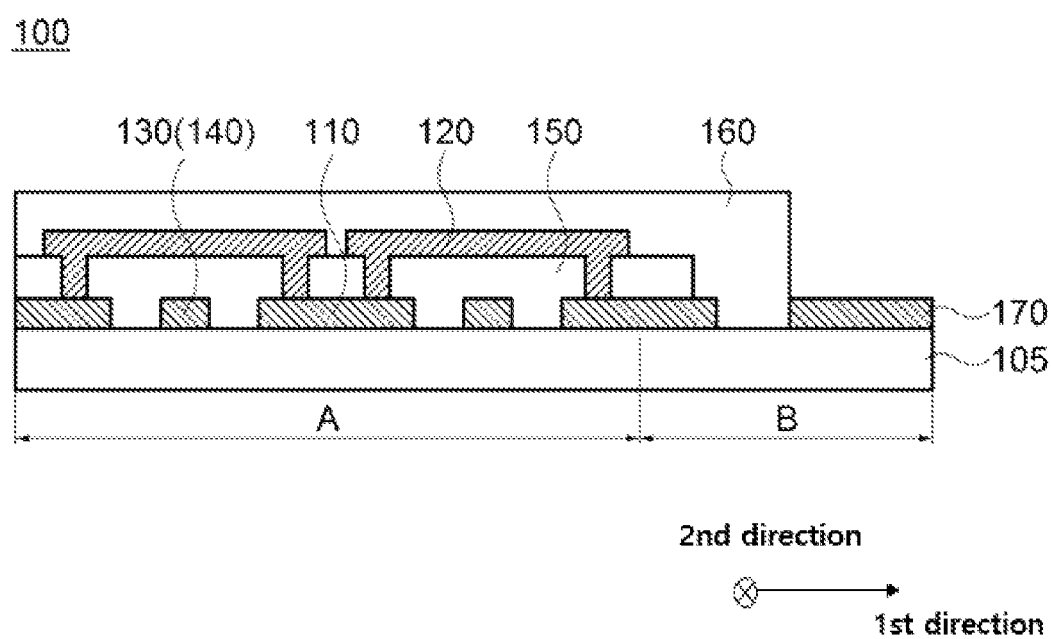
FIG. 2 is a schematic cross-sectional view illustrating a construction of a touch sensor layer included in an electrode structure combined with an antenna in accordance with exemplary embodiments.

FIG. 1 is a schematic top planar view illustrating a construction of a touch sensor layer included in an electrode structure combined with an antenna in accordance with exemplary embodiments. FIG. 2 is a schematic cross-sectional view illustrating a construction of a touch sensor layer included in an electrode structure combined with an antenna in accordance with exemplary embodiments. For example, FIG. 2 illustrates a touch sensor structure having a top-bridge structure in which a bridge electrode 120 is disposed over sensing electrodes 110 and 130.

Referring to FIGS. 1 and 2, a touch sensor layer 100 may include a substrate layer 105 and the sensing electrodes 110 and 130 arranged on the substrate layer 105.

The substrate layer 105 may encompass a film-type substrate used as a base layer to form the sensing electrodes 110 and 130 or an object on which the sensing electrodes 110 and 130 are formed. In some embodiments, the substrate layer 105 may refer to an encapsulation layer of a display panel on which the sensing electrodes 110 and 130 are stacked.

For example, the substrate layer 105 may be a substrate or film material commonly used in a touch sensor without particular limitation, and may include, e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), etc. Examples of the inorganic insulating material may include silicon oxide, silicon nitride, silicon oxynitride, a metal oxide, etc.

The sensing electrodes 110 and 130 may include first sensing electrodes 110 and second sensing electrodes 130.

The first sensing electrodes 110 may be arranged, e.g., in a first direction (e.g., an X-axis direction) parallel to a top surface of the substrate layer 105. In some embodiments, the first sensing electrodes 110 may be physically spaced apart from each other as island-type unit electrodes. In this case, the first sensing electrodes 110 neighboring in the first direction may be electrically connected to each other by the bridge electrode 120.

Accordingly, a first sensing electrode row extending in the first direction may be formed by the plurality of first sensing electrodes 110 and the bridge electrode 120. Additionally, a plurality of the first sensing electrode rows may be arranged in a second direction that may be parallel to the top surface of the substrate layer 105 to intersect the first direction. For example, the first direction and the second direction may be perpendicular to each other.

The second sensing electrodes 130 may be arranged, e.g., in a second direction (e.g., a Y-axis direction). In some embodiments, the second sensing electrodes 130 neighboring in the second direction may be physically or electrically connected to each other by a connector 140. For example, the connector 140 may be integrally formed with the second sensing electrodes at the same level as that of the second sensing electrodes 130.

Accordingly, a second sensing electrode column extending in the second direction may be formed by the second sensing electrodes 130 connected to each other by the connector 140. A plurality of the second sensing electrode columns may be arranged in the first direction.

For example, the sensing electrodes 110 and 130 and the bridge electrode 120 may include silver (Ag), gold (Au), copper (Cu), aluminum (Al), platinum (Pt), palladium (Pd), chromium. (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca), or an alloy containing at least one of the metals (e.g., silver-palladium-copper (APC) or copper-calcium (CuCa)). These may be used alone or in combination of at least two therefrom.

The sensing electrodes 110 and 130 and/or the bridge electrode 120 may include a transparent conductive oxide such as, e.g., indium tin oxide (ITO), indium zinc oxide (IZO), zinc oxide (ZnO), indium zinc tin oxide (IZTO), cadmium tin oxide (CTO), etc.

In some embodiments, the sensing electrodes 110 and 130 and the bridge electrode 120 may include a multi-layered-structure of a transparent conductive oxide layer and a metal layer. For example, the sensing electrodes 110 and 130 and the bridge electrode 120 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

As illustrated in FIG. 2. the insulating layer 150 may at least partially cover the sensing electrodes 110 and 130 on the substrate layer 105. In exemplary embodiments, the insulating layer 150 may be formed at an intersection region C of the first sensing electrode 110 and the second sensing electrode 130, may cover the connector 140 of the second sensing electrode 130. The bridge electrode 120 may be formed on the insulating layer 150 to be connected to the neighboring first sensing electrodes 110.

The insulating layer 150 may include an inorganic insulating material such as silicon oxide, silicon nitride, etc., or an organic insulating material such as an acrylic resin, a siloxane-based resin, etc.

As illustrated in FIG. 2, the touch sensor 100 may include a sensing region A and a wiring region B. The sensing electrodes 110 and 130 and the bridge electrode 120 may be disposed on the substrate layer 105 of the sensing region A. A touch sensing pad 170 may be disposed on the substrate layer 105 of the wiring region B.

In exemplary embodiments, a trace branching from each of the first sensing electrode rows and the second sensing electrode columns may extend to the wiring region B and may be electrically connected to the touch sensing pad 170.

Accordingly, a physical touch information input to the touch sensor 100 may be converted into an electrical signal due to a difference in capacitance by the first sensing electrode 110 and the second sensing electrode 130, and the electrical signal may be transferred to, e.g., a touch sensing driving integrated circuit (IC) through the touch sensing pad 170 to implement a touch sensing. The touch sensing driving IC may be bonded to the touch sensing pad 170 through, e.g., a flexible printed circuit board (FPCB).

A passivation layer 160 may protect the sensing electrodes 110 and 130 and the bridge electrode 120 on the sensing region A, and may extend to the wiring region B. The passivation layer 160 may include, e.g., an opening exposing the touch sensing pad 170.

The passivation layer 160 may include an inorganic insulating material such as silicon oxide, silicon nitride, etc., or an organic insulating material such as an acrylic resin, a siloxane-based resin, etc.

As illustrated in FIG. 1, each of the first sensing electrode 110 and the second sensing electrode 130 may be patterned in a predetermined shape.

In exemplary embodiments, an edge or boundary portion of the first sensing electrode 110 and the second sensing electrode 130 may be patterned in a wavy shape. Accordingly, a moiré phenomenon caused by an overlap with electrodes or wirings (a data line, a gate line, etc.) included in the display panel disposed under the touch sensor layer 100 may be reduced.

Alternatively, the first sensing electrode 110 and the second sensing electrode 130 may have a polygonal pattern shape such as a rhombus shape or a hexagonal shape.

Figure 3:
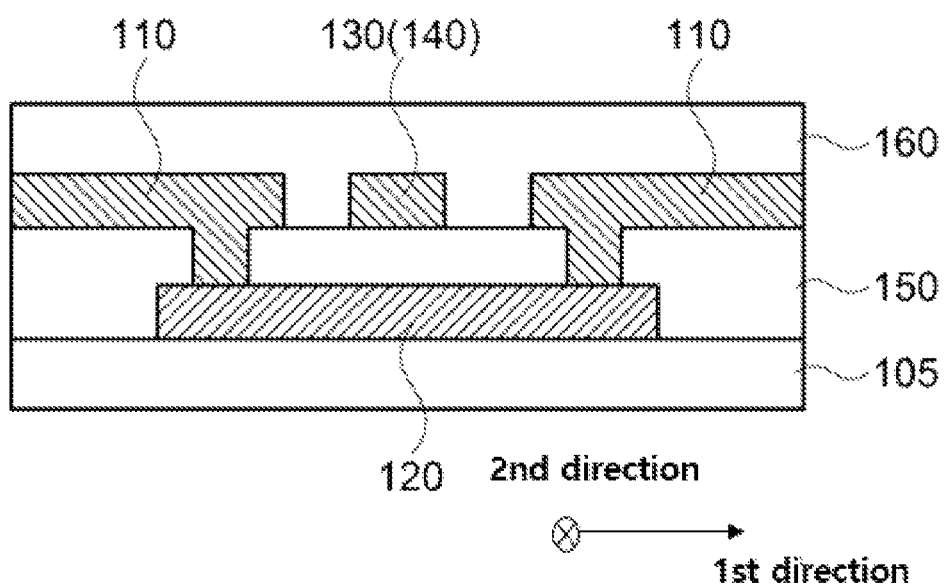
FIG. 3 is a schematic cross-sectional view illustrating a construction of a touch sensor layer included in an electrode structure combined with an antenna in accordance with some exemplary embodiments.

FIG. 3 is a schematic cross-sectional view illustrating a construction of a touch sensor layer included in an electrode structure combined with an antenna in accordance with some exemplary embodiments.

Referring to FIG. 3, electrodes included in the touch sensor layer 100 may be arranged based on a bottom-bridge structure. In exemplary embodiments, the bridge electrode 120 may be disposed on the substrate layer 105, and the insulating layer 150 covering the bridge electrode 120 may be formed on the substrate layer 105.

Contact holes exposing a top surface of the bridge electrode 120 may be formed in the insulating layer 150. The second sensing electrodes 130 may be arranged on the insulating layer 150 in an arrangement substantially the same as or similar to that described with reference to FIGS. 1 and 2.

The first sensing electrodes 110 may fill the contact holes on the insulating layer 150 and may be electrically connected to the bridge electrode 120. The first sensing electrodes 110 neighboring in the first direction may be disposed to face each other with the connector 140 interposed therebetween. The bridge electrode 120 may overlap the connector 140 in a thickness direction at the intersection region C with the insulating layer 150 interposed therebetween.

The passivation layer 160 may be formed on the insulating layer 150 to cover the sensing electrodes 110 and 130.

Figure 4:
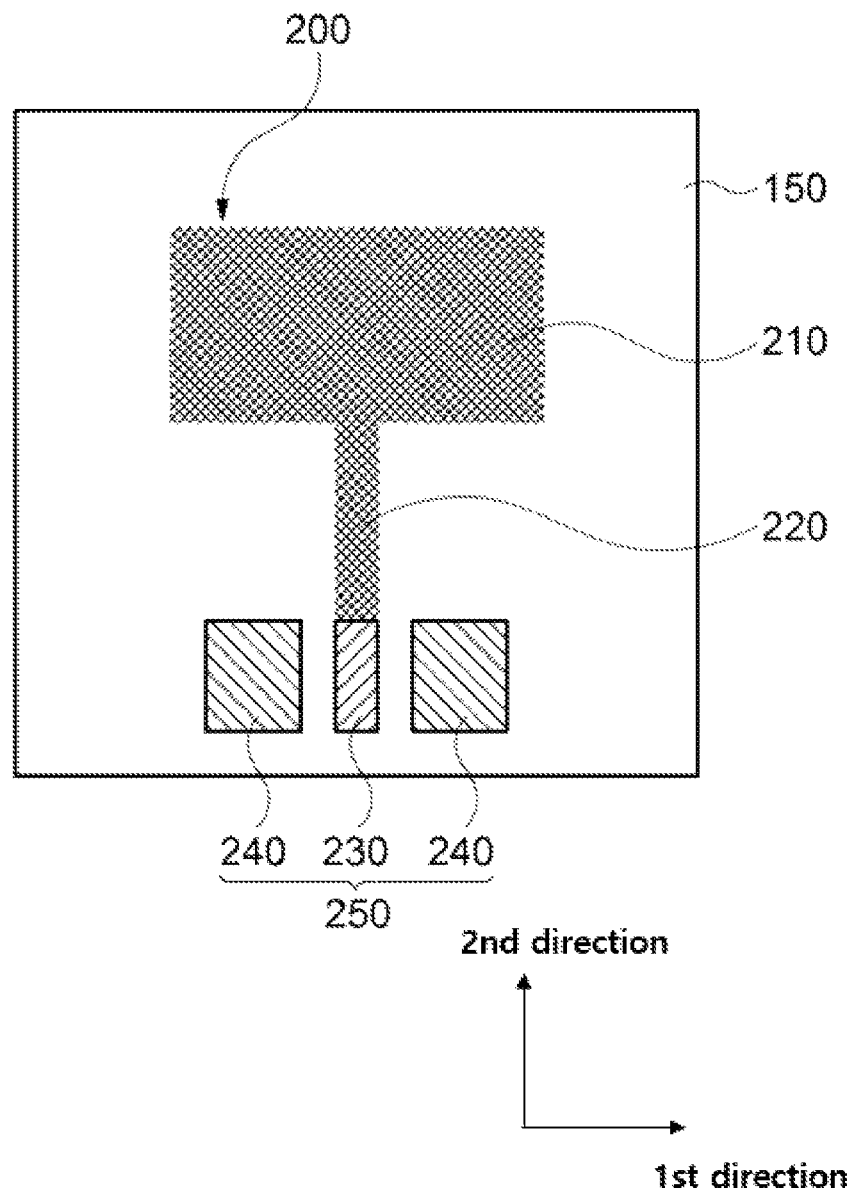
FIG. 4 is a schematic top planar view illustrating a construction of an antenna unit included in an electrode structure combined with an antenna in accordance with exemplary embodiments.

FIG. 4 is a schematic top planar view illustrating a construction of an antenna unit included in an electrode structure combined with an antenna in accordance with exemplary embodiments. For example, the antenna unit may have a structure capable of implementing high-frequency or ultra-high frequency mobile communications (e.g., 3G, 4G, 5G or higher).

Referring to FIG. 4, the antenna unit 200 may include a radiator 210, a transmission line 220 and an antenna pad 250. The antenna pad 250 may include a signal pad 230 and a ground pad 240.

The radiator 210 may have, e.g., a polygonal plate shape, and the transmission line 220 may extends from a central portion of the radiator 210 in, e.g., the second direction to be electrically connected to the signal pad 230. The transmission line 220 may have a smaller width than that of the radiator 210 and may be formed as a single member substantially integral with the radiator 210.

In some embodiments, a pair of the ground pads 240 may be disposed with the signal pad 230 interposed therebetween. The ground pads 240 may be electrically and physically separated from the signal pad 230 and the transmission line 220.

The radiator 210, the transmission line 220 and/or the antenna pad 250 may include silver (Ag), gold (Au), copper (Cu), aluminum (Al), platinum (Pt), palladium (Pd), chromium. (Cr), titanium (Ti), tungsten (W), niobium (Nb), tantalum (Ta), vanadium (V), iron (Fe), manganese (Mn), cobalt (Co), nickel (Ni), tin (Sn), zinc (Zn), molybdenum (Mo), calcium (Ca), or an alloy containing at least one of the metals. For example, the radiator 210 may include silver (Ag) or an silver alloy (e.g., a silver-palladium-copper (APC) alloy), or copper (Cu) or a copper alloy (e.g., a copper-calcium (CuCa) alloy) for implementing a low resistance and a fine line-width.

The radiator 210, the transmission line 220 and/or the antenna pad 250 may include a transparent conductive oxide such as indium tin oxide (ITO), indium zinc oxide (IZO), zinc oxide (ZnO), indium zinc tin oxide (IZTO), cadmium tin oxide (CTO), etc.

In some embodiments, the radiator 210, the transmission line 220 and/or the antenna pad 250 may include a multi-layered-structure of a transparent conductive oxide layer and a metal layer. For example, radiator 210, the transmission line 220 and/or the antenna pad 250 may include a double-layered structure of a transparent conductive oxide layer-metal layer, or a triple-layered structure of a transparent conductive oxide layer-metal layer-transparent conductive oxide layer. In this case, flexible property may be improved by the metal layer, and a signal transmission speed may also be improved by a low resistance of the metal layer. Corrosive resistance and transparency may be improved by the transparent conductive oxide layer.

In exemplary embodiments, the radiator 210 may have a mesh structure. Thus, as will be described later with reference to FIGS. 5 and 6, even when the radiator 210 overlaps the sensing electrodes 110 and 130, generation of a parasitic capacitance may be reduced and transmittance may be improved. In some embodiments, the sensing electrodes 110 and 130 included in the touch sensor layer 100 may have a solid structure to improve sensing sensitivity.

In an embodiment, the transmission line 220 may also have a mesh structure. The antenna pads 250 may have a solid structure to reduce a feeding resistance and a signal transmission resistance.

In an embodiment, a dummy mesh pattern (not illustrated) may be arranged around the radiator 210.

In exemplary embodiments, the antenna unit 200 may be disposed at the same layer or at the same level as that of the bridge electrode 120 of the above-described touch sensor layer 100. As described with reference to FIG. 2, if the bridge electrode 120 is disposed on the insulating layer 150, the antenna unit 200 may be disposed on the insulating layer 150. In this case, the insulating layer 150 may serve as a dielectric layer of the antenna unit 220.

As described with reference to FIG. 3, if the touch sensor layer 100 has the bottom-bridge structure, the antenna unit 200 may be disposed on the substrate layer 105 together with the bridge electrode 120.

Figure 5:
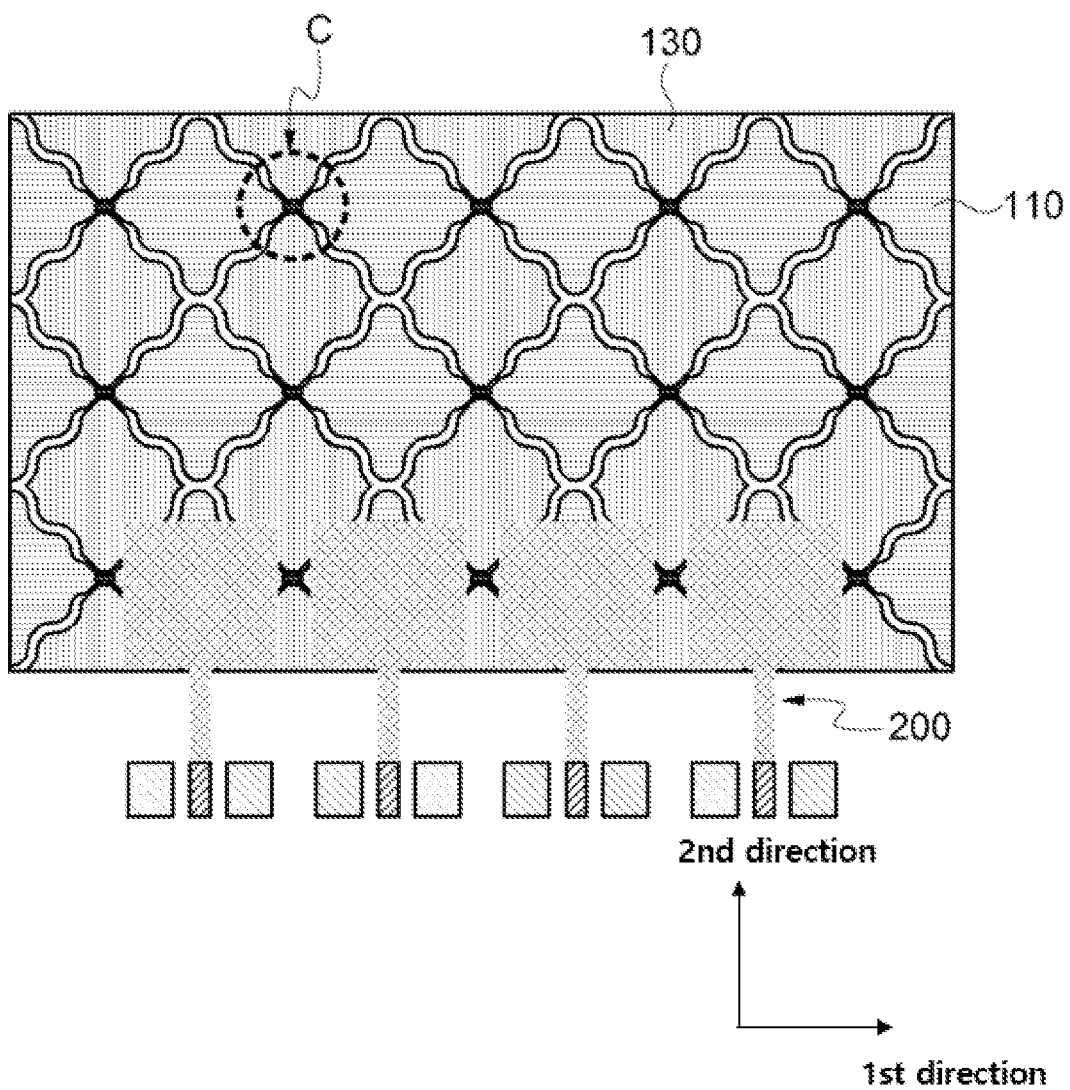
FIGS. 5 and 6 are schematic top planar views illustrating arrangements of a touch sensor layer and an antenna unit in an electrode structure combined with an antenna in accordance with exemplary embodiments.
Figure 6:
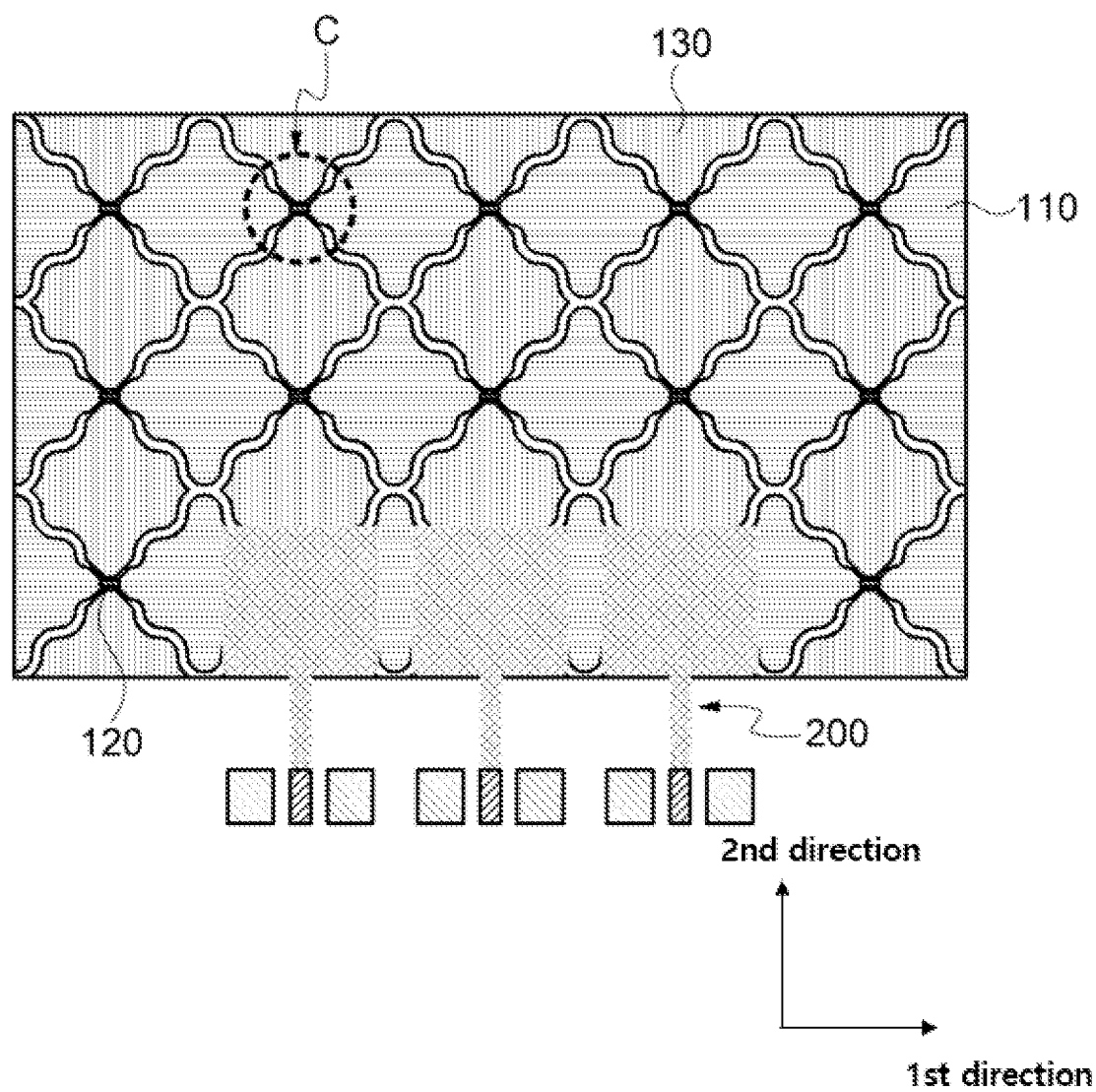

FIGS. 5 and 6 are schematic top planar views illustrating arrangements of a touch sensor layer and an antenna unit in an electrode structure combined with an antenna in accordance with exemplary embodiments.

Referring to FIG. 5, the radiators 210 included in the antenna units 200 may be disposed to overlap the sensing electrodes 110 and 130 when being projected in a planar view.

In exemplary embodiments, the radiator 210 may be disposed on the sensing region A together with the sensing electrodes 110 and 130, and the antenna pads 250 may be disposed on the wiring region B. Accordingly, the antenna pads 250 may be connected to the antenna driving IC chip utilizing the wiring region B where the connection to the driving IC chip is implemented while mounting the antenna unit 200 using the sensing region A.

As described above, the antenna unit 200 may be disposed at the same layer as that of the bridge electrode 120 of the touch sensor layer 100. Thus, the antenna unit 200 may be formed together by using a patterning process or an etching process for forming the bridge electrode 120 of the touch sensor layer 100.

Accordingly, the antenna unit 200 may also be formed by using a space and a process of the touch sensor layer 100, so that a spatial degree of freedom and a degree of device integration may be improved.

As illustrated in FIG. 5, the radiator 210 of the antenna unit 200 may overlap each of the first sensing electrode 110 or the second sensing electrode 130 in the planar view. In an embodiment, corner portions of the radiator 210 may overlap each of four sensing electrodes 110 and 130 around the sensing electrode 110 and 130 overlapping a central portion of the radiator 210.

In this case, a parasitic capacitance generated between the central portion of the radiator 210 and the sensing electrodes 110 and 130 may be distributed to peripheral portions of the neighboring sensing electrodes 110 and 130 through the corner portions. Thus, excessive degradation of sensing sensitivity in the sensing electrodes 110 and 130 overlapping the central portion of the radiator 210 may be prevented.

Referring to FIG. 6, the radiator 210 of the antenna unit 200 may overlap the intersection region C in which the bridge electrode 120 of the touch sensor layer 100 may be located in a planar view. In this case, the radiator 210 may overlap the four sensing electrodes 110 and 130 around the intersection region C.

The radiator 210 may overlaps the intersection region C, so that the parasitic capacitance between the radiator 210 and the sensing electrodes 110 and 130 may be uniformly distributed in the first sensing electrode row and second sensing electrode column directions. Thus, a non-uniformity of touch sensing caused by an increase of the parasitic capacitance in either the row direction or the column direction may be prevented.

For convenience of descriptions, the antenna unit 200 is illustrated as being disposed above the sensing electrodes 110 and 130 in FIGS. 5 and 6, but the antenna unit 200 may be disposed below the sensing electrodes 110 and 130.

Figure 7:
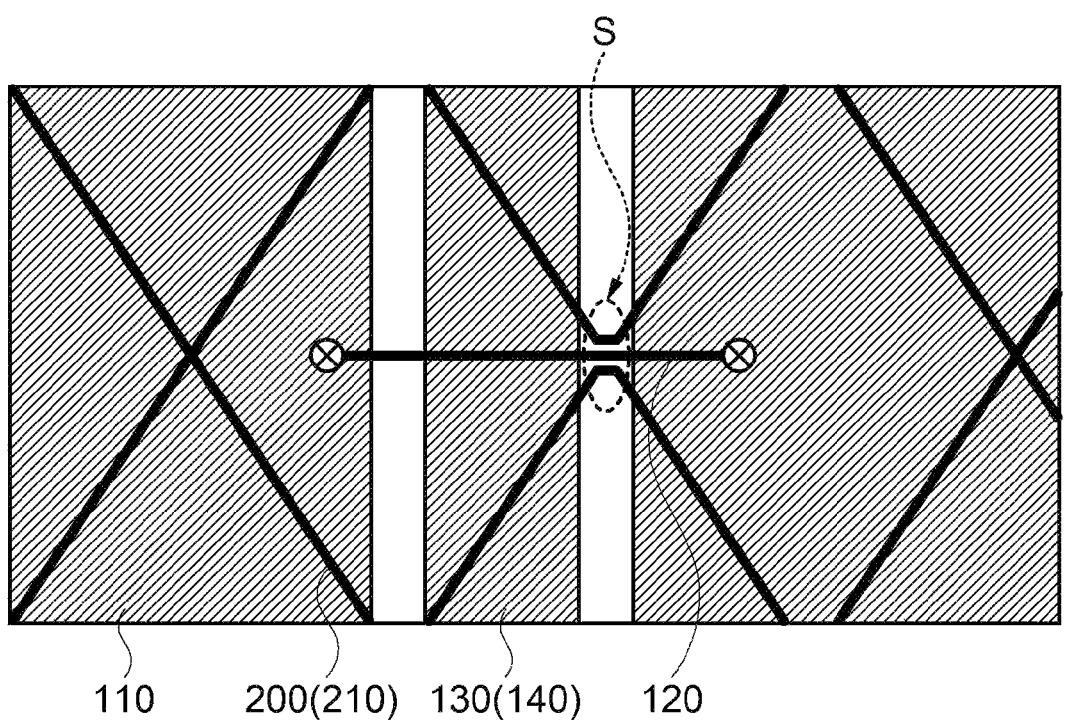
FIG. 7 is a partially enlarged top planar view illustrating an arrangement of a touch sensor layer and an antenna unit in an intersection region of the touch sensor layer in accordance with exemplary embodiments.

FIG. 7 is a partially enlarged top planar view illustrating an arrangement of a touch sensor layer and an antenna unit in an intersection region of the touch sensor layer in accordance with exemplary embodiments.

Referring to FIG. 7, as described with reference to FIG. 6, if the radiator 210 overlaps the intersection region C of the touch sensor layer 100, the bridge electrode 120 may be formed within the radiator 210.

As described above, the radiator 210 may have a mesh structure. In this case, a plurality of intersecting electrode lines may be included in the radiator 210.

The bridge electrode 120 may be included in the mesh structure of the radiator 210 to cross the connector 140, and may electrically connect, e.g., the neighboring first sensing electrodes 110 to each other.

A separation region S at which the electrode lines are partially cut may be formed in the mesh structure. The bridge electrode 120 may extend in a space between the electrode lines and/or in the separation region S. Accordingly, a sensing error occurring when the bridge electrode 120 is in contact with or electrically connected to the mesh structure of the radiator 210 may be prevented.

Figure 8:
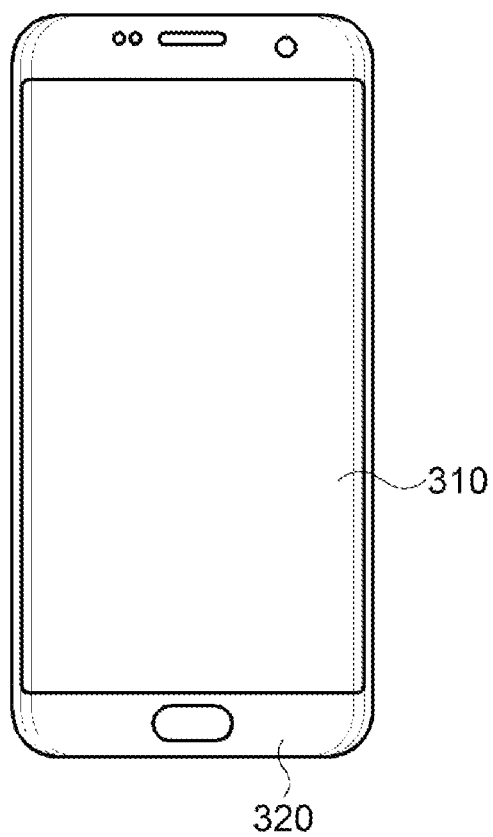
FIG. 8 is a schematic top planar view illustrating a display device in accordance with exemplary embodiments.

FIG. 8 is a schematic top planar view illustrating a display device in accordance with exemplary embodiments. For example, FIG. 8 shows an outer shape including a window of a display device.

Referring to FIG. 8, the display device 300 may include a display area 310 and a peripheral area 320. The peripheral area 320 may be disposed at both lateral portions and/or both end portions of the display area 310. The peripheral area 320 may correspond to, e.g., a light-shielding portion or a bezel portion of an image display device.

The electrode structure described above may be disposed over the display area 310 and the peripheral area 320 of the display device 300, and the sensing electrodes 110 and 130 of the touch sensor electrode layer 100 may be arranged in the display area 310. Further, the radiator 210 of the antenna unit 200 may also be arranged in the display area 310. As described above, the radiators 210 may be prevented from being recognized to a user by using the mesh structure.

The touch sensing pads 170 of the touch sensor layer 100 illustrated in FIG. 2 and the antenna pads 250 of the antenna unit 200 illustrated in FIG. 4 may be disposed in the peripheral area 320.

Additionally, the touch sensor driving IC chip and the antenna driving IC chip may be disposed together in the peripheral region 320, and may be electrically connected to the touch sensing pads 170 of the touch sensor layer 100 and the antenna pads 250 of the antenna unit 200, respectively.

According to the above-described exemplary embodiments, the antenna unit 200 of the electrode structure may be integrated at the level of the bridge electrode 120 of the touch sensor layer 100, so that a spatial degree of freedom of the display device may be increased.

What is claimed is:

1. An electrode structure combined with an antenna, comprising:
    a substrate layer;
    a plurality of sensing electrodes arranged on the substrate layer, the sensing electrodes comprising first sensing electrodes arranged along a first direction parallel to a top surface of the substrate layer, and second sensing electrodes arranged along a second direction parallel to the top surface of the substrate layer and intersecting the first direction;
    a bridge electrode connecting the first sensing electrodes neighboring in the first direction; and
    an antenna unit disposed at the same layer as that of the bridge electrode, the antenna unit comprising a radiator overlapping the sensing electrodes in a planar view,
    wherein corner portions of the radiator overlap four sensing electrodes around a sensing electrode overlapping a central portion of the radiator in the planar view.

2. The electrode structure combined with an antenna of claim 1, further comprising an insulating layer covering the sensing electrodes, wherein the bridge electrode and the antenna unit are disposed on the insulating layer.

3. The electrode structure combined with an antenna of claim 1, wherein the bridge electrode is disposed below the sensing electrodes.

4. The electrode structure combined with an antenna of claim 3, further comprising an insulating layer covering the bridge electrode on the substrate layer,
    wherein the sensing electrodes are disposed on the insulating layer.

5. The electrode structure combined with an antenna of claim 1, wherein the radiator includes a mesh structure, and the sensing electrodes have a solid structure.

6. The electrode structure combined with an antenna of claim 1, wherein the antenna unit further comprises a transmission line extending from the radiator, and a signal pad connected to one end portion of the transmission line.

7. The electrode structure combined with an antenna of claim 6, wherein the antenna unit further comprises a ground pad disposed around the signal pad to be separated from the transmission line and the signal pad.

8. The electrode structure combined with an antenna of claim 6, wherein the top surface of the substrate layer has a sensing region and a wiring region, and the sensing electrodes are arranged on the sensing region.

9. The electrode structure combined with an antenna of claim 8, further comprising touch sensing pads electrically connected to the sensing electrodes and disposed on the wiring region,
    wherein the signal pad of the antenna unit is disposed on the wiring region.

10. A display device comprising the electrode structure combined with an antenna of claim 1.

11. An electrode structure combined with an antenna, comprising:
    a substrate layer;
    a plurality of sensing electrodes arranged on the substrate layer, the sensing electrodes comprising first sensing electrodes arranged along a first direction parallel to a top surface of the substrate layer, and second sensing electrodes arranged along a second direction parallel to the top surface of the substrate layer and intersecting the first direction;
    a bridge electrode connecting the first sensing electrodes neighboring in the first direction; and
    an antenna unit disposed at the same layer as that of the bridge electrode, the antenna unit comprising a radiator overlapping the sensing electrodes in a planar view,
    a connector extending in the second direction to be integrally formed with the second sensing electrodes and connect the second sensing electrodes neighboring each other,
    wherein the radiator overlaps an intersection region at which the bridge electrode and the connector intersect in the planar view.

12. The electrode structure combined with an antenna of claim 11, wherein the radiator overlaps with four sensing electrodes around the intersection region.

13. The electrode structure combined with an antenna of claim 11, wherein the bridge electrode is included within the radiator.

14. The electrode structure combined with an antenna of claim 13, wherein the radiator has a mesh structure defined by electrode lines crossing each other, and
    the mesh structure includes a separation region in which a portion of the electrode lines are cut.

15. The electrode structure combined with an antenna of claim 14, wherein the bridge electrode extends in a space between the electrode lines and in the separation region.

* * * * *